US009493108B2

United States Patent
Morishita et al.

(10) Patent No.: US 9,493,108 B2
(45) Date of Patent: Nov. 15, 2016

(54) APPARATUS FOR DETECTING OTHER VEHICLE LIGHTS AND LIGHT CONTROL APPARATUS FOR VEHICLES

(71) Applicant: DENSO CORPORATION, Kariya, Aichi-pref. (JP)

(72) Inventors: Taiji Morishita, Kariya (JP); Hironori Sato, Okazaki (JP); Kentarou Shiota, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 424 days.

(21) Appl. No.: 14/346,099

(22) PCT Filed: Sep. 19, 2012

(86) PCT No.: PCT/JP2012/073884
§ 371 (c)(1),
(2) Date: Mar. 20, 2014

(87) PCT Pub. No.: WO2013/042675
PCT Pub. Date: Mar. 28, 2013

(65) Prior Publication Data
US 2014/0226349 A1  Aug. 14, 2014

(30) Foreign Application Priority Data

Sep. 21, 2011  (JP) .................................. 2011-205946

(51) Int. Cl.
*G06K 9/00* (2006.01)
*B60Q 1/076* (2006.01)
(Continued)

(52) U.S. Cl.
CPC .............. *B60Q 1/076* (2013.01); *B60Q 1/143* (2013.01); *B60R 1/00* (2013.01); *G06K 9/00825* (2013.01); *B60Q 2300/41* (2013.01); *B60Q 2300/42* (2013.01)

(58) Field of Classification Search
CPC .. B60Q 1/076; B60Q 1/143; B60Q 2300/41; B60Q 2300/42; B60R 1/00; G06K 9/00825
See application file for complete search history.

(56) References Cited

U.S. PATENT DOCUMENTS

2008/0030374 A1*  2/2008  Kumon .................. B60Q 1/143
340/937
2008/0088481 A1*  4/2008  Kumon ................ B60Q 1/1423
340/937
(Continued)

FOREIGN PATENT DOCUMENTS

JP  60-255537 A  12/1985
JP  62-131837 A  6/1987
(Continued)

OTHER PUBLICATIONS

English Translation of the International Preliminary Report on Patentability (Chapter I of the Patent Cooperation Treaty), mailed Apr. 3, 2014.
International Search Report (Japanese and English) and Written Opinion of the ISA (Japanese), ISA/JP, mailed Dec. 25, 2013.

*Primary Examiner* — Amara Abdi
(74) *Attorney, Agent, or Firm* — Harness, Dickey & Pierce, P.L.C.

(57) ABSTRACT

An on-vehicle apparatus detects other vehicle lights from an image picked up outside the vehicle. The apparatus acquires an image around the vehicle and extracts light sources from the image. The apparatus calculates a target area probability that is a probability of a light source in a target area being different vehicle light, in accordance with a probability that light-source feature quantities at least including either of a color of light source and a shape of light source coincide with target-area feature quantities, the target area indicating a preset site that is a part of an area indicating each of the light sources. The target-area feature quantities are prepared as feature quantities of vehicle light, being correlated to the position of a target area. The apparatus outputs information that a light source having the target area probability of not less than a preset threshold is different vehicle light.

16 Claims, 8 Drawing Sheets

(51) Int. Cl.
B60Q 1/14 (2006.01)
B60R 1/00 (2006.01)

(56) References Cited

U.S. PATENT DOCUMENTS

2010/0091513 A1* 4/2010 Kamioka ............. B60Q 1/1423
362/523

2010/0195908 A1* 8/2010 Bechtel .................. H04N 5/213
382/167

FOREIGN PATENT DOCUMENTS

| JP | H05-093981 U | | 12/1993 | |
| JP | 2008040615 A | | 2/2008 | |
| JP | 2010-221756 | * | 10/2010 | ............... B60Q 1/14 |
| JP | 2010221756 A | | 10/2010 | |

* cited by examiner

APPARATUS FOR DETECTING OTHER VEHICLE LIGHTS AND LIGHT CONTROL APPARATUS FOR VEHICLES

CROSS-REFERENCE TO RELATED APPLICATION

This application is a U.S. National Phase application under 35 U.S.C. §371 of International Application No. PCT/JP2012/073884, filed Sep. 19, 2012, which is based on and claims the benefit of priority from earlier Japanese Patent Application No. 2011-205946 filed Sep. 21, 2011, the description of which is incorporated herein by reference.

TECHNICAL FIELD

The present invention relates to an apparatus installed in a vehicle to detect light such as of different vehicle headlights or tail lights from a picked-up image, a program for a computer that detects the light, and a light control apparatus for vehicles, which uses the detection result to control the direction of the optical axes of the vehicle's headlights.

BACKGROUND ART

Conventionally, various systems have been provided as a means for controlling the direction of the optical axes of vehicle headlights. An example of the systems is disclosed in Patent Document 1. The system described in Patent Document 1 (title of the invention is "Apparatus for recognizing traveling vehicles") picks up images in color in the forward direction of the vehicle to obtain images in color. Image signals corresponding to tail lights and headlights are extracted from the signals of the color image to recognize the presence of tail lights or headlights. Of these signals, the image of tail lights is used to calculate a distance to the forward vehicle and a relative speed. Based on the calculation result, the headlights are controlled, for example, so as to be switched to low beam.

In order to perform a series of processes of the control, the type of a light source is required to be determined. In this regard, Patent Document 1 provides a method of determining the type of a light source, which is based on a color (balance of RGB signals) detected in an area of a light source in a picked-up image.

PRIOR ART

Patent Documents

[Patent Document 1] JP-A-S62-131837

SUMMARY OF THE INVENTION

Problems to be Solved by the Invention

However, in the conventional system mentioned above, the color of which portion of a light source area should be used as a basis for the detection of light is not clear. Therefore, depending on the site from which color is detected, correct color is not necessarily detected. In order to enhance the accuracy of detection in this conventional system, the sampling frequency for detecting color may only have to be raised to detect color at a number of points of the light source area. However, such a configuration may excessively increase the processing load.

In light of such a problem, the present invention has as its object to enhance the accuracy of detecting light in a system for detecting different vehicle light from a picked-up image, without excessively increasing the processing load in detecting different vehicle headlights or tail lights.

Means for Solving the Problem

An apparatus for detecting different vehicle light has been made in order to achieve the object, with a basic configuration as provided below. Specifically, in the apparatus, an image acquiring means picks up an image around the vehicle and acquires the image, and a light source extracting means extracts light sources in the image. Further, a probability calculating means calculates a target area probability that is a probability of a light source in a target area being different vehicle light, in accordance with a probability that light-source feature quantities at least including either of a color of light source and a shape of light source coincide with target-area feature quantities that are prepared as feature quantities of vehicle light, being correlated to the position of a target area, the target area indicating a preset site that is a part of an area indicating each of the light sources. Further, a light outputting means outputs information that a light source having the target area probability of not less than a preset threshold is different vehicle light.

According to this apparatus, a target area whose light-source feature quantities are subjected to comparison is set in a portion of an area that indicates a light source. Thus, compared to a configuration in which a target area is set covering the entire area indicating a light source, the processing load is reduced in detecting other vehicle light from the light source.

In the apparatus, the probability calculating means, for example, may be configured to calculate the target area probability by detecting an average value, as the light-source feature quantities, of colors of pixels that configure a target area and comparing the average value with the color of vehicle light prepared as the target-area feature quantities.

According to the apparatus, a target area probability can be calculated by comparing an average value of color of pixels with the target-area feature quantities (color of vehicle light provided in advance). Accordingly, compared to the case where, for example, color is subjected to comparison on a pixel basis, the processing load is reduced.

Further, in the apparatus, as another example, the light source extracting means may extract a light source area in a rectangular shape, and the probability calculating means may be configured to calculate the target area probability by calculating, as the light-source feature quantities, a proportion of the number of pixels having a predetermined luminance or more with respect to the number of pixels configuring a light source, and comparing the proportion with a proportion indicating vehicle light prepared as the target-area feature quantities.

According to the apparatus, the proportion of an area included in a target area and having a predetermined luminance or more is compared with the target-area feature quantities to calculate a target area probability. Thus, the processing load is reduced compared, for example, to a configuration in which vehicle light is detected by performing pattern matching for the shape of a light source.

Further, in the apparatus, as still another example, the target area may be set in an area excluding the center of an area that indicates a light source.

According to the apparatus, a target area is set in an area excepting an area at the center of a light source, in which a color is difficult to be detected or which is likely to be unnecessary in detecting a shape. Thus, a target area probability can be efficiently detected.

Further, in the apparatus, as another example, the target area may be set in an area including a right end portion or a left end portion of an area that indicates a light source.

According to the apparatus, a target area is set in an area that includes a right end portion or a left end portion, in light of the fact that many objects that could be a light source, such as traffic lights, tail lights, headlights or signboards, are horizontally long. Thus, vehicle light can be efficiently detected from a narrower target area.

Further, in the apparatus, the target area may be set in an area including an upper end portion or a lower end portion of an area that indicates a light source.

It is a general practice that, in processing an image, data is consecutively read from a left end pixel to a right end pixel of an uppermost row and then data are consecutively read from a left end pixel to a right end pixel of the subsequent row. In this case, it takes a little time in a search from the right end pixel to the left end pixel of the subsequent row. Therefore, the time required for reading data can be more reduced if the number of rows of data is smaller.

In this regard, in the detection apparatus related to the present invention, a target area is set in an area that includes an upper end portion or a lower end portion to make the target area horizontally long and reduce the number of rows of data. Thus, according to the apparatus, the time required for reading data can be reduced.

Further, in order to achieve the object, a program is also provided. The program is stored in a memory of a computer so as to be rewritable and readable to allow the computer to execute the function of each of the various configurations.

According to the program, advantageous effects similar to those in the apparatus for detecting different light described above can be enjoyed.

Further, in order to achieve the object, a vehicle light control apparatus is provided as another mode. The control apparatus includes a vehicle detecting means for detecting a different vehicle that is present around the vehicle installing the control apparatus, and an optical axis direction changing means for changing the direction of the optical axes of the headlights downward when the different vehicle is detected, these means being included in any one of the various configurations of the detection apparatus described above. The vehicle detecting means is configured as the detection apparatus described above.

According to the light control apparatus, the optical axes (beam angle) of headlights are correctly controlled so that the driver of a different vehicle will not be dazzled.

In the configurations mentioned above, the feature quantities of color and shape of vehicle light, the feature quantities of color and shape of disturbing objects that indicate a light source other than vehicles, and the like may only have to be retained in advance as a database in the detection apparatus or in a recording section, such as a memory, of an external unit.

MODES FOR IMPLEMENTING THE INVENTION

With reference to the drawings, hereinafter is described an embodiment related to the present invention.

Configuration of the Present Embodiment

Figure 1:
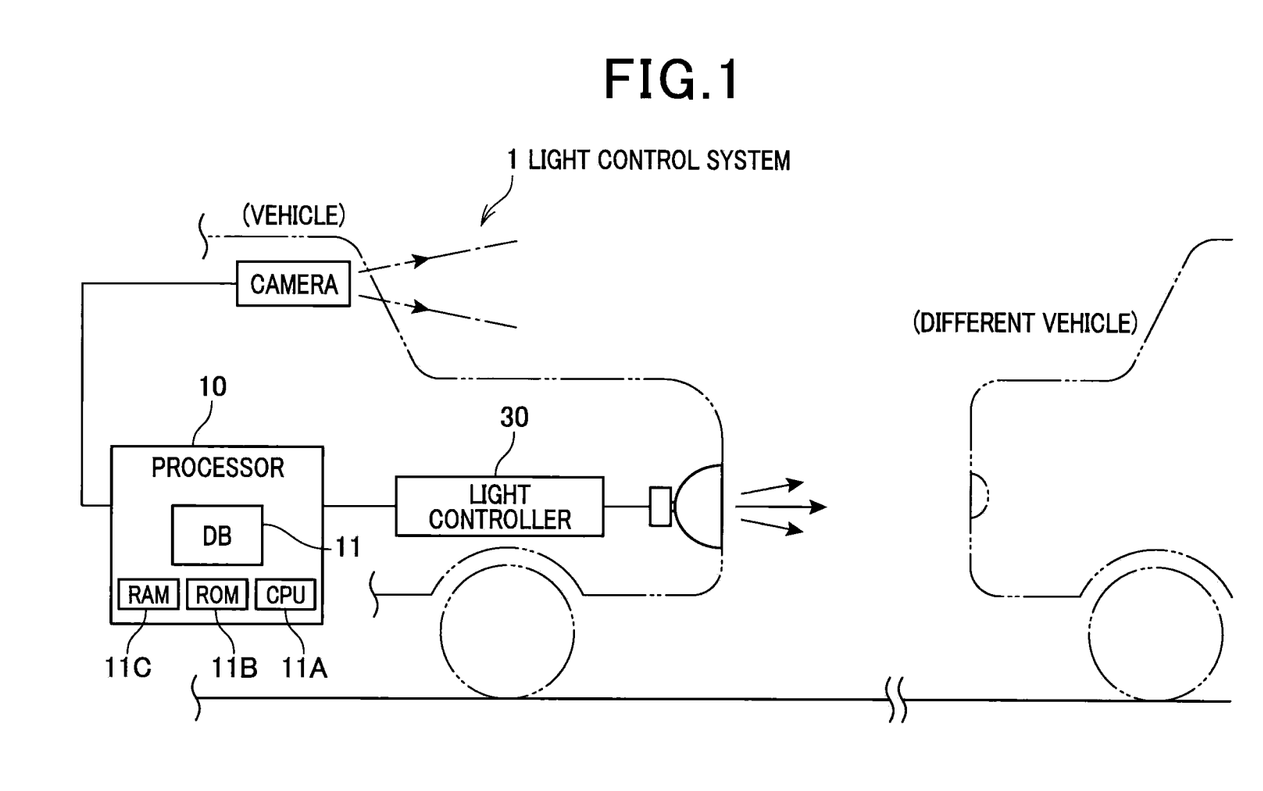
FIG. 1 is a block diagram illustrating a schematic configuration of a light control system 1.

FIG. 1 is a block diagram illustrating a schematic configuration of a light control system 1 to which the present invention is applied. The light control system 1 is installed in a vehicle, such as a passenger car. Under the condition that different vehicles are present around the vehicle (specifically, under the condition that different vehicles are present in a range in which the headlights of the vehicle may dazzle the eyes of the different vehicle drivers), the light control system 1 has a function of downwardly changing the direction of the optical axes (beam angle) of the headlights of the own vehicle and preventing the dazzle.

Further, detection of different vehicle light (headlights and tail lights) is performed in a portion of an area that indicates a light source, that is, a target area indicating a site set in advance. A light source has color and shape (light-source feature quantities). Being correlated to the position of the target area, a parameter (target-area feature quantities) is prepared as feature quantities of vehicle light. According to the probability for the light-source feature quantities to coincide with the target-area feature quantities (whether the color and the shape of the light source are in a predetermined tolerable range), the light source in the target area is determined as to whether it corresponds to different vehicle light.

Specifically, as shown in FIG. 1, the light control system 1 includes a processor 10 (corresponding to the apparatus for detecting different vehicle light), a camera 20 and a light controller 30. The camera 20 is arranged such that at least the illumination range of the headlights of the vehicle in the traveling direction (forward direction, in particular) is included in an imaging range. The camera 20 transmits an image it has picked up to the processor 10.

The light controller 30 receives the result of detection of vehicle light from the processor 10 to control the direction of the optical axes of headlights 40. Specifically, upon reception of detection result that vehicle light is present in the picked-up image, the light controller 30 switches the headlights 40 to low beam, and upon reception of detection result that vehicle light is not present in the picked-up image, the light controller 30 switches the headlights 40 to high beam (optical axis direction changing means). The light controller 30 may be configured to move the direction of the optical axes to a direction in which different vehicles are not present (e.g., downward or leftward) in accordance with an instruction from the processor 10.

The processor 10 is configured as a well-known microcomputer that includes a CPU 10A used for calculation, ROM 10B in which data/information is recorded in advance, and RAM 10C in which data is temporarily stored. The CPU 10A performs various processes including a light control process (light detection program) described later, on the basis of a program stored in the ROM 10B or a program loaded in the RAM 10C. Thus, the ROM 10B functions as a recording medium that stores in advance a program for controlling the direction of the optical axes of the headlights 40 of the vehicle. This program is read out from the ROM 10B to a work area of the CPU 10A for execution.

The processor 10 includes a database (DB) 11 that stores parameters indicating the features of vehicle light (values indicating the shapes, colors and the like such as of headlights or tail lights) and parameters indicating the features of light sources other than vehicles (values indicating the shapes, colors and the like such as of signboards or light reflectors). The parameters stored in the database 11 are used in detecting a light source that indicates vehicle light from a picked-up image, distinguishing from the light sources other than vehicle light.

[Process Performed in the Present Embodiment]

Figure 2:
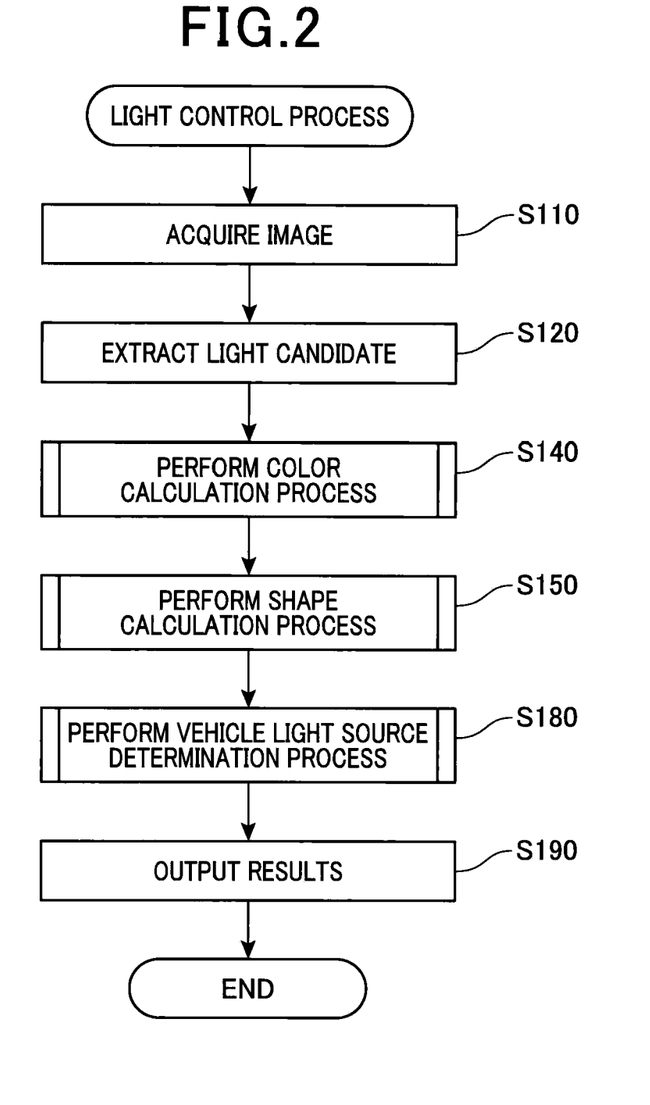
FIG. 2 is a flowchart illustrating a light control process of an embodiment.

Referring now to FIG. 2, hereinafter is described a process of identifying a light source that indicates vehicle light in a picked-up image and controlling the direction of the optical axes of the headlights. FIG. 2 is a flowchart illustrating a light control process performed by the CPU 10A of the processor 10. The processes at S110 to S180 of the light control process correspond to the different vehicle detecting means, and the processes at S140, S150 and S180 of the light control process correspond to the probability calculating means.

When power is applied to the vehicle, the processor 10 starts the light control process in response to the application of power. The light control process is performed by the processor 10 at a predetermined cycle (e.g., every 100 ms).

Upon start of the light control process, the processor acquires a picked-up image from the camera 20 (step S110 of FIG. 2 functionally corresponding to the picked-up image acquiring means).

Then, the processor extracts an area having a high probability of being vehicle light as a "light candidate" from the picked-up image (S120 functionally corresponding to the light source extracting means). In this processing, the processor cuts out a minimum area in a rectangular shape which includes all areas as a light source in the picked-up image, and labels (gives a number to) each of the cut out areas. According to this processing, a larger light source in the picked-up image is cut out in a larger area. This processing may only have to be performed on the basis of a known method and accordingly may be performed, for example, by subjecting an image signal for each pixel to threshold processing.

Subsequently, various processes including a color calculation process (S140), a shape calculation process (S150) and a vehicle light source determination process (S160), which will be described later, are sequentially performed. After completing the vehicle light determination process, the processor transmits the results of detecting vehicle light to the light controller 30 (S190 corresponding to the light outputting means) and terminates the light control process.

Figure 3:
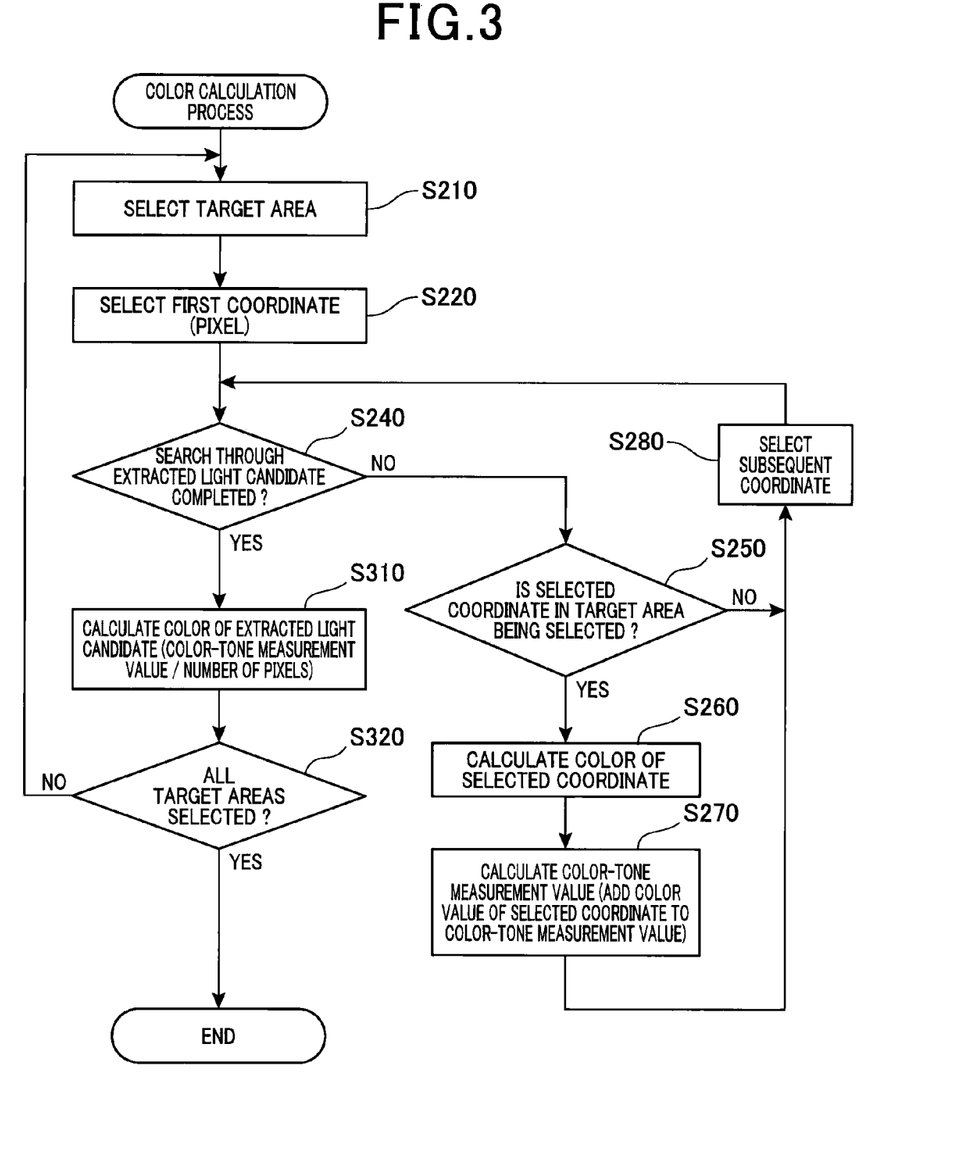
FIG. 3 is a flowchart illustrating a color calculation process.

Referring now to a flowchart shown in FIG. 3, the color calculation process mentioned above is described. In the color calculation process, an average value of colors of individual pixels that configure a target area is detected.

When the color calculation process is started, the processor firstly selects a target area that is a target for which color calculation is performed (S210). For example, in the present embodiment, a target area is set in advance, on a system side, in an area excepting the center of an area indicating a light candidate.

In the color calculation process, in particular, two areas are set as target areas which are an area occupying about 35% from the right end portion and an area occupying about 35% from the left end portion, with respect to the width of an area that indicates a light candidate. Thus, in the color calculation process, either one of these areas (e.g., the left side are) is selected as a target area. If the present color calculation process has been performed after the processing at S320 described later, a target area not yet selected (e.g., the right side area) is selected.

Figure 4:
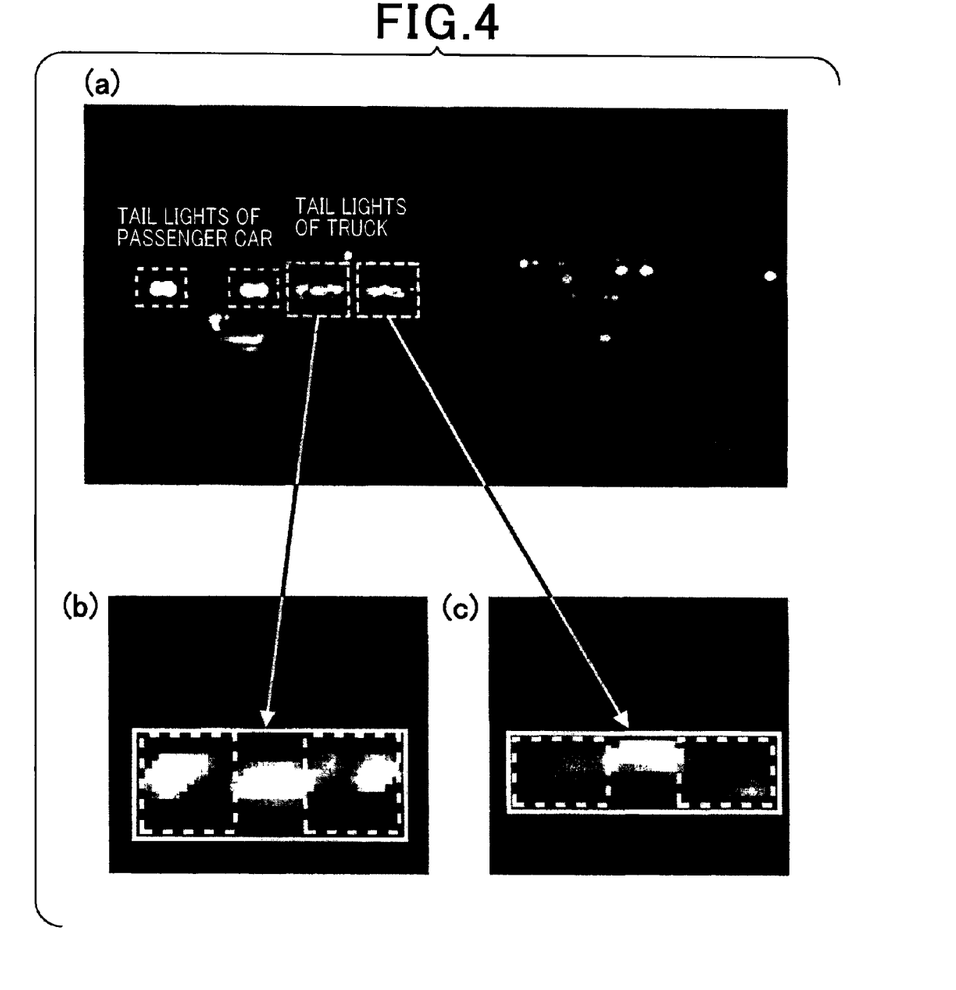
FIG. 4 is an explanatory view showing a specific example of the color calculation process.

For example, when a picked-up image as shown by (a) of FIG. 4 has been acquired, areas (areas indicating light candidates) shown by the white solid lines in (b) and (c) of FIG. 4 are extracted in the processing at S120. In the color calculation process, the areas shown by the white broken lines are selected as target areas. FIG. 4 shows an example of a light candidate which includes the right or left tail lights and the light reflector (or the number plate) at the center. It will be understood that the target areas include sites of the tail light but hardly include the area of the light reflector.

Subsequently, in a selected area, a first coordinate is selected (S220). For example, in this processing, the pixel at the upper left corner of the target area is selected.

Then, the processor determines whether or not the extracted light candidate has been searched through (whether or not the processing at S250 described later has been conducted for all of pixels) (S240). If the selected light candidate has not yet been searched through (NO at S240), the processor determines whether or not the selected coordinate (pixel) is in the target area being selected (S250).

If the selected coordinate (pixel) is in the target area being selected (YES at S250), the color of the selected coordinate is calculated as numerical values (S260). In this processing, the color in the selected coordinate is broken down into predetermined signal components (e.g., RGB, Lab and the like) and the individual values are retained.

Subsequently, a color-tone measurement value is calculated (S270). In this processing, the numerical values of the color calculated this time are accumulated for each target area and for each signal component. When the processing at S270 is completed and when, in the processing at S250, the selected coordinate (pixel) is out of the target area being selected (NO at S250), an unselected subsequent coordinate (e.g., the coordinate adjacent on the right to the selected coordinate) is selected (S280). Then, control returns to S240.

If the search through the extracted light candidate has been completed at S240 mentioned above (YES at S240), a color tone as an extracted light candidate is calculated (S310). In this processing, the color-tone measurement value (accumulated value) calculated in a target area being selected is divided by the number of pixels of the target area being selected to calculate the color of the target area. Then, in the case where the color of a target area is calculated for a plurality of target areas, the colors of these target areas are averaged to calculate a color of the light candidate.

In the present process, when the light candidate includes tail lights, the target areas are ensured not to include the light reflector. Therefore, the color or the like of the tail lights can be detected as a correct color, not being mixed with other colors.

Subsequently, the processor determines whether or not all the target areas included in the light candidate have been selected (S320). If any one of the target areas has not been selected (NO at S320), control returns to the processing at S210. If all the target areas have been selected (YES at S320), the color calculation process is terminated.

Figure 5:
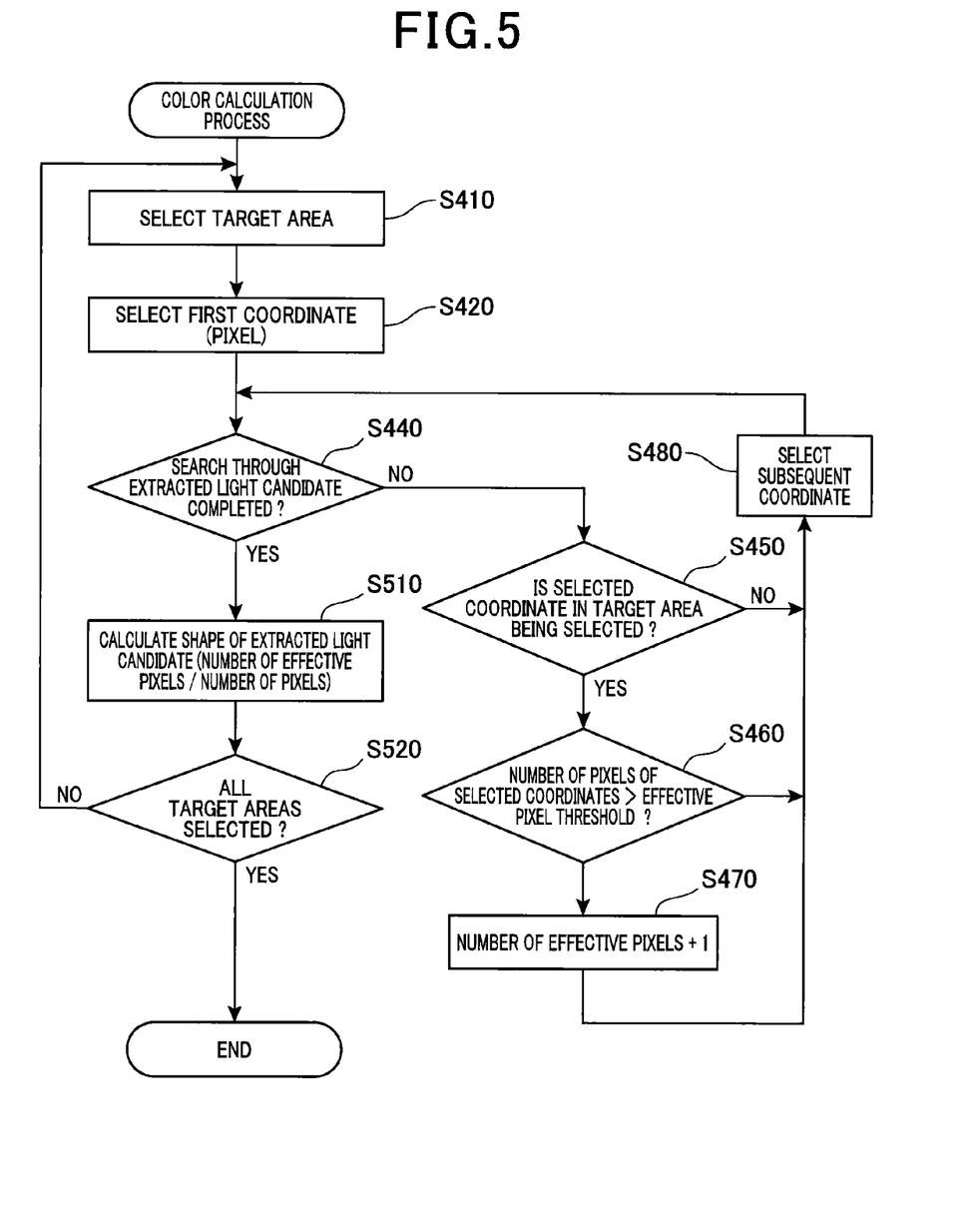
FIG. 5 is a flowchart illustrating a shape calculation process.

Referring now to a flowchart shown in FIG. 5, the shape calculation process is described. In the shape calculation process, the processor carries out a process of calculating a proportion of the pixels having a predetermined luminance or more, with respect to the number of pixels configuring the light source area.

In the shape calculation process, the processor firstly selects a target area that is a target for which color calculation is performed (S410). Target areas are set in advance. In the present process as well, target areas are set in an area excepting the center of an area indicating a light candidate.

In the present process, in particular, two areas are set as target areas which are an area occupying about 30% from the upper end portion and an area occupying 30% from the lower end portion, with respect to the width of the area indicating a light candidate. The processor selects one of these target areas (e.g., the upper side area). If the present process has been performed after the processing at S520 described later, a target area not yet selected (e.g., the lower side area) is selected.

Figure 6:
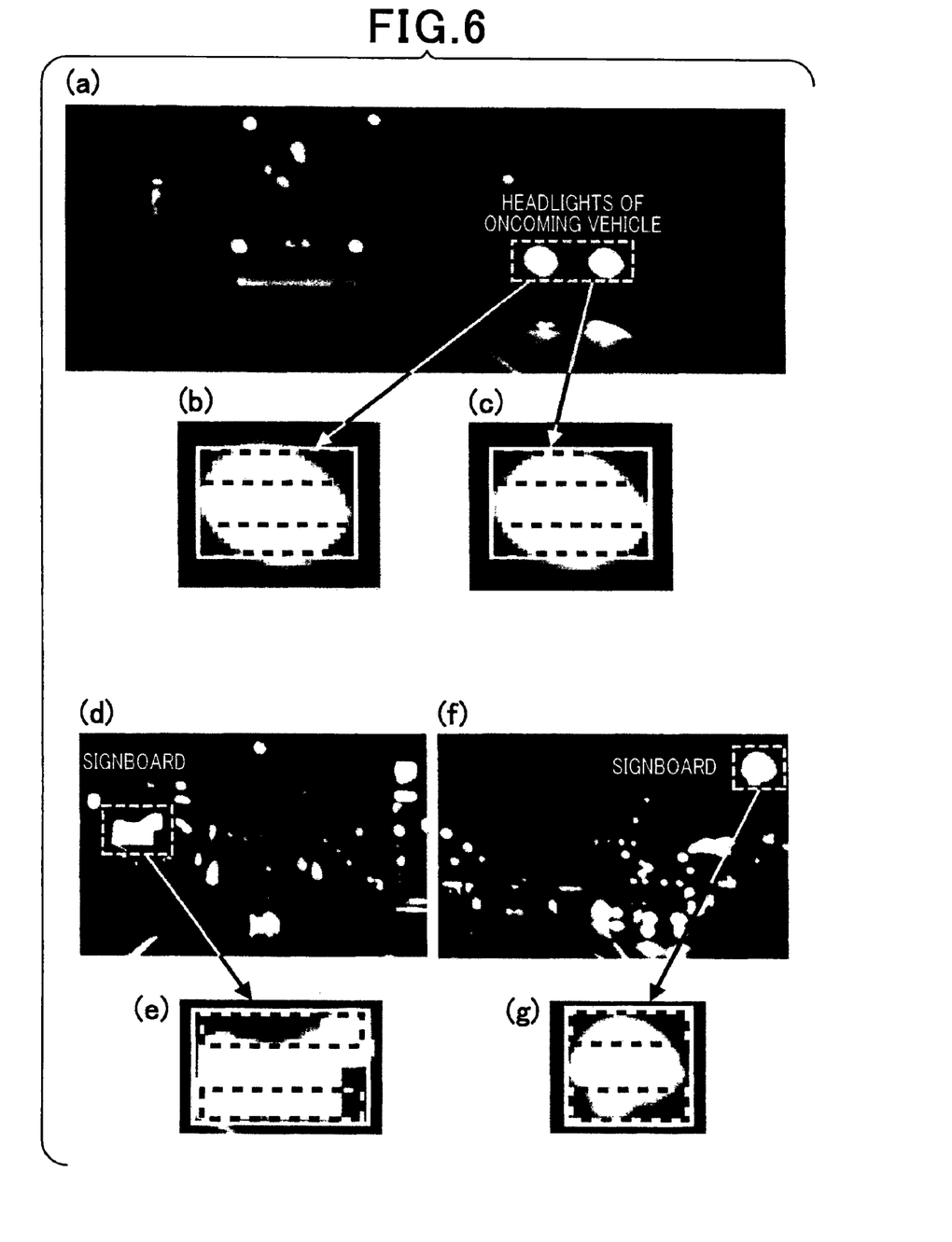
FIG. 6 is an explanatory view showing a specific example of the shape calculation process.

For example, when a picked-up image including headlights of a vehicle as shown by (a) of FIG. 6 has been acquired, the processor extracts, in the processing at S120, the area indicated by the white solid line in (b) or (c) of FIG. 6 (area indicating a light candidate). In this processing, the areas shown by the broken lines are selected as target areas. Similarly, when a picked-up image including a signboard as shown by (d) or (f) of FIG. 6 has been acquired, the areas shown by the broken lines in (e) or (g) of FIG. 6 are selected as a target areas.

Subsequently, the processor selects a first coordinate from a selected area (S420). For example, in this processing, the pixel at the upper left corner of the target area is selected.

Then, the processor determines whether or not a search through the extracted light candidate has been completed (whether or not the processing at S450 described later has been performed for all the pixels) (S440). If the search through the extracted light candidate has not been completed (NO at S440), the processor determines whether or not the selected coordinate (pixel) is in the target area being selected (S450).

If the selected coordinate (pixel) is in the target area being selected (YES at S450), the processor compares the pixel value (luminance value) of the selected pixel with an effective pixel threshold (e.g., value set to about 40% from the bottom of the width of a dynamic range) that is a threshold for determining the effectiveness as a pixel value indicating the area of a light source (S460). If the pixel value is larger than the effective pixel threshold (YES at S460), the processor increments (the counter indicating) the number of effective pixels (S470).

When the processing at S470 is completed and when, in the processing at S450, the selected coordinate (pixel) is out of the target area being selected (NO at S450) and when, in the processing at step S460, the pixel value is less than the effective pixel threshold (NO at S460), the processor selects an unselected subsequent coordinate (e.g., the coordinate adjacent on the right to the selected coordinate) (S480). Then, control returns to S440.

In the processing at S440 mentioned above, if the search through the extracted light candidate has been completed (YES at S440), the processor calculates the shape (area ratio) of the extracted light candidate (S510). In this processing, the number of effective pixels calculated in a target area being selected is divided by the number of pixels in the target area being selected to thereby calculate the shape of the light source in the target area. Then, in the case where the shape of the light source is calculated for a plurality of target areas, the calculated shapes are averaged to calculate the shape of the light candidate.

For example, when the light candidate corresponds to a headlight, the shape of the light source is approximately a circle as shown by (b) or (c) of FIG. 6. Accordingly, the number of effective pixels with respect to the number of pixels in the target areas will have an area ratio corresponding to a circle. On the other hand, when a light candidate does not correspond to a headlight, the number of effective pixels with respect to the number of pixels in the target areas will have an area ratio different from that of a headlight, as shown by (e) or (g) of FIG. 6.

Subsequently, the processor determines whether or not all the target areas included in the light candidate have been selected (S520). If any one of the target areas has not been selected (NO at S520), control returns to S410. If all of the target areas has been selected (YES at S520), the shape calculation process is terminated.

Figure 7:
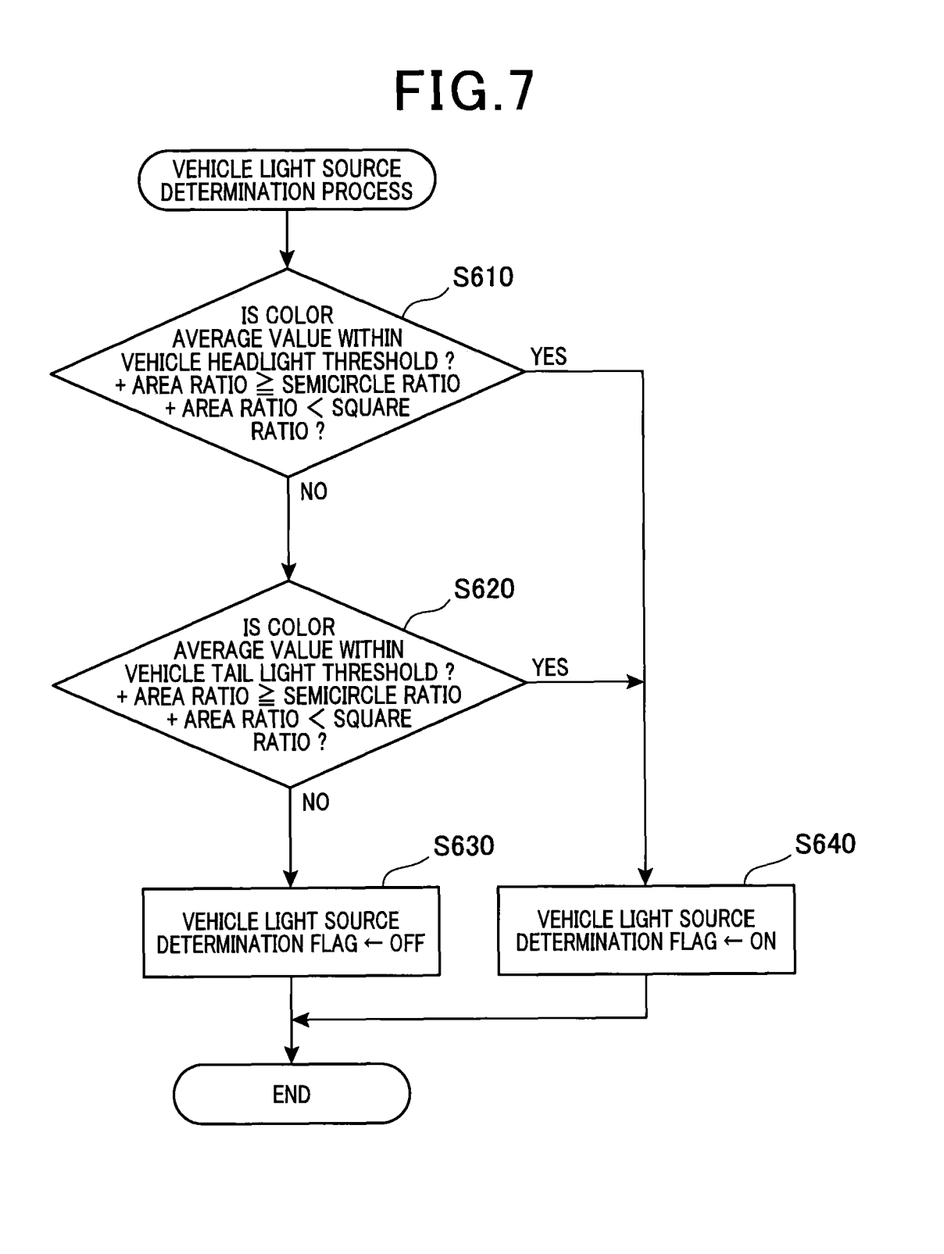
FIG. 7 is a flowchart illustrating a vehicle light source determination process of an embodiment.

Referring now to a flowchart shown in FIG. 7, the vehicle light source determination process is described. The vehicle light source determination process is a process for determining whether or not a light candidate corresponds to a vehicle headlight, using the calculation results of the color calculation process and the shape calculation process.

In the vehicle light source determination process, the processor firstly determines whether or not all of the conditions are met (S610), the conditions being: that the color average value is within a range provided in advance (threshold) as a headlight of a vehicle; that the area ratio is equal to or more than a semicircle ratio that indicates a semicircular shape provided in advance as the shape of a headlight; and that the area ratio is less than a square ratio that indicates a square signboard or the like.

Since the color of headlights is close to white, color thresholds for color signal components (e.g. RGB) in this processing are all set to a comparatively large value. Also, the semicircle ratio is set to a value smaller than that of the square ratio.

If any one of the conditions is not met (NO at S610), the processor determines whether or not all of the conditions are met (S620), the conditions being: that the color average value is within a range provided in advance (threshold) as a tail light of a vehicle; that the area ratio is equal to or more than a semicircle ratio that indicates a semicircular shape provided in advance as the shape of a tail light; and that the area ratio is less than a square ratio that indicates a square signboard or the like.

Since the color of tail lights is close to red, the color threshold for red color signal component among the color components (e.g. RGB) in this processing is set to a comparatively large value, while those for other color components are set to a small value. Further, parameters, such as thresholds and ratios provided in advance, are recorded in the database 11.

If any one of the conditions is not met (NO at S620), it is regarded that the light candidate is not originated from vehicle light. Then, the processor sets a vehicle light source determination flag to OFF (S630). Then, the vehicle light source determination process is terminated.

If all of the conditions are met in the processing at S610 or S620 (YES at S610 or YES at S620), it is regarded the light candidate is originated from vehicle light. Then, the processor sets the vehicle light source determination flag to ON (S640). Then, the vehicle light source determination process is terminated.

Advantageous Effects of the Present Embodiment

In the light control system 1 specifically described so far, the processor 10 detects different vehicles that are present around the own vehicle. When different vehicles are detected around the own vehicle, the light controller 30 downwardly changes the direction of the optical axes of the headlights. In particular, in the process of detecting a different vehicle, the processor 10 acquires a picked-up image in which the surrounding of the own vehicle is imaged and then extracts light sources in the picked-up image. Then, in a portion of an area that indicates each light source, that is, in a target area indicating a site set in advance, the processor calculates a target area probability that is a probability that the light source in the target area corresponds to different vehicle light, in accordance with the probability that light-source feature quantities including at least one of the color and the shape of the light source coincide with target-area feature quantities provided as feature quantities of vehicle light, being correlated to the position of the target area. Further, for the light source whose target area probability is not less than a preset threshold, the processor 10 outputs data that the light source is originated from a different vehicle.

Thus, according to the light control system 1, the target area, which is compared with the light-source feature quantities, is set as a portion of an area indicating the light source. Accordingly, compared to a configuration in which a target area is set covering the entire area of indicating the light source, the processing load is reduced in detecting different vehicle light from a light source. In addition, the direction of the optical axes of the headlights is accurately controlled so that a different vehicle's driver will not be dazzled.

In the light control system 1, the processor 10 detects an average value, as light-source feature quantities, of the colors of the pixels configuring a target area. Then, comparing the average value with the color of the vehicle light provided as target-area feature quantities, the processor calculates a target area probability.

Thus, according to the light control system 1, a target area probability can be calculated through a comparison of an average value of the colors of the pixels with target-area feature quantities (provided as a color of vehicle light). This reduces a processing load compared, for example, to a configuration in which comparison is made on a pixel basis.

Further, in the light control system 1, the processor 10 extracts a light source area in a rectangular shape, and calculates a proportion of the number of pixels, as light-source feature quantities, having a predetermined luminance or more, with respect to the number of pixels configuring the light source area. Then, the processor compares the proportion with a proportion that indicates vehicle light, which has been provided as target-area feature quantities to thereby calculate a target area probability.

Thus, according to the light control system 1, a target area probability can be calculated by comparing the proportion of an area having a predetermined luminance or more included in a target area, with target-area feature quantities (proportion indicating vehicle light, as provided). This reduces a processing load compared, for example, to a configuration in which vehicle light is detected by performing pattern matching for the shape of a light source.

In the light control system 1, a target area is set in an area excepting the center of an area indicating a light source.

Thus, according to the light control system 1, a target area is set in an area excepting an area at the center of a light source, in which a color is difficult to be detected or which is likely to be unnecessary in detecting a shape. This enables efficient calculation of a target area probability.

Further, in the light control system 1, a target area is set in an area that includes a right end portion or a left end portion of an area indicating a light source.

Thus, according to the light control system 1, a target area is set in an area that includes a right end portion or a left end portion, in light of the fact that many objects that could be a light source, such as traffic lights, tail lights, headlights or signboards, are horizontally long. This enables efficient detection of vehicle light from a narrower target area.

In the light control system 1, a target area is also set in an area that includes an upper end portion or a lower end portion of an area indicating a light source.

It is a general practice that, in processing an image, data is consecutively read from a left end pixel to a right end pixel of an uppermost row and then data are consecutively read from a left end pixel to a right end pixel of the subsequent row. In this case, it takes a little time in a search from the right end pixel to the left end pixel of the subsequent row. Therefore, the time required for reading data can be more reduced if the number of rows of data is smaller.

In this regard, in the light control system 1, a target area is set in an area that includes an upper end portion or a lower end portion to make the target area horizontally long and reduce the number of rows of data. Thus, according to the light control system 1, the time required for reading data can be reduced.

Other Embodiments

The mode for implementing the present invention is not limited to the foregoing embodiment but may be implemented in various modes as far as the modes fall within a technical scope of the present invention.

For example, in the foregoing embodiment, a target area includes a right end area or a left end area, or an upper end area or a lower end area. However, a target area may be any area if only the center of an area as a light candidate is excluded. A target area may be a combination of a plurality of areas.

In the light control process of the foregoing embodiment, the processor performs both of a determination based on color (color calculation process) and a determination based on shape (shape calculation process). However, either one of these may be performed. In this case, only the determination result based on color or the determination result based on shape may be used in the vehicle light source determination process.

Figure 8A:
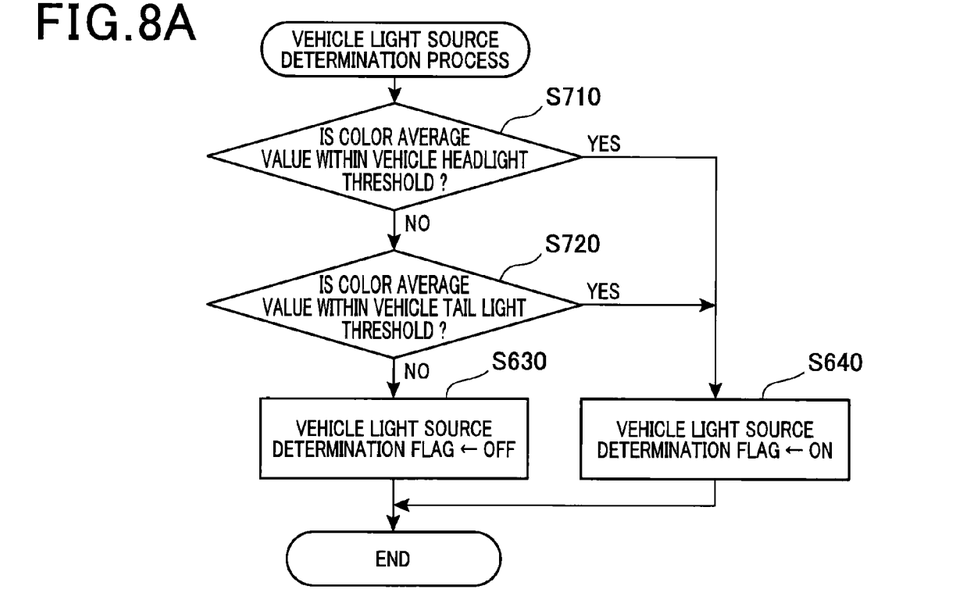
FIG. 8A is a flowchart illustrating a vehicle light source determination process of a modification.

Specifically, as shown in FIG. 8A, when the determination result based color alone is used, some steps may be replaced as follows. Specifically, in place of the processing at S610 mentioned above, the processor may determine whether or not the color average value is within a range provided in advance (threshold) as vehicle headlights (S710). Further, in place of the processing at S620, the processor may determine whether or not the color average value is within a range provided in advance (threshold) as vehicle tail lights (S620).

Figure 8B:
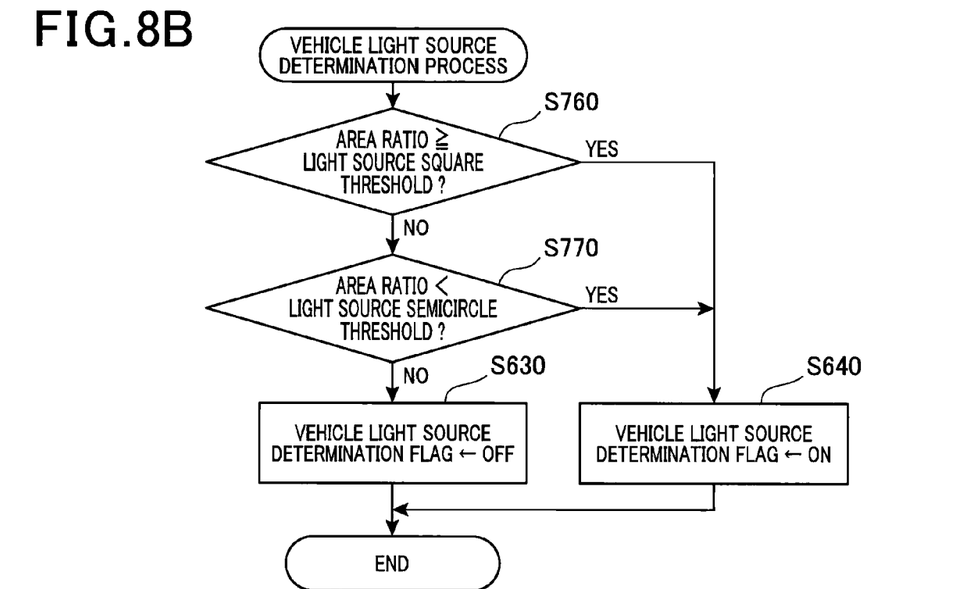
FIG. 8B is a flowchart illustrating a vehicle light source determination process of another modification.

Further, as shown in FIG. 8B, when the determination result based on shape alone is used, some steps may be replaced as follows. Specifically, in place of the processing at S610 mentioned above, the processor may determine whether or not an area ratio is equal to or more than a ratio that indicates a semicircular shape provided in advance as a shape of a headlight (S760). Also, in place of the processing at S620, the processor may determine whether or not the area ratio is less than a square ratio that indicates a square signboard or the like (S770).

In this way, the processing load is more reduced.

Further, in performing both of the determination based on color (color calculation process) and the determination based on shape (shape calculation process), the processor may perform as follows. Specifically, the processor may score the degree of match between a numerical value of color and a numerical value as vehicle light and the degree of match between a numerical value of shape and the numerical value as vehicle light. Then, the processor may determine whether or not the light is originated from a vehicle on the basis of a weighted average of the scores.

DESCRIPTION OF REFERENCE NUMERALS

1 . . . Light control system
10 . . . Processor
11 . . . Database
20 . . . Camera
30 . . . Light controller

What is claimed is:

1. An apparatus installed in a vehicle to detect different vehicle light from an image picked up outside the vehicle, the apparatus comprising:
    a processor configured to implement the steps of:
    picking up an image around the vehicle and acquiring the image;
    extracting light sources in the image;
    calculating a target area probability that is a probability of a light source in a target area being different vehicle light, in accordance with a probability that light-source feature quantities at least including either of a color of light source and a shape of light source coincide with target-area feature quantities that are prepared as feature quantities of vehicle light, being correlated to the position of a target area, the target area indicating a preset site that is a part of an area indicating each of the light sources; and
    outputting information that a light source having the target area probability of not less than a preset threshold is different vehicle light.

2. The apparatus according to claim 1, wherein the target area probability is calculated by detecting an average value, as the light-source feature quantities, of colors of pixels that configure a target area and comparing the average value with the color of vehicle light prepared as the target-area feature quantities.

3. The apparatus according to claim 2, wherein: a light source area is extracted in a rectangular shape; and the target area probability is calculated by calculating, as the light-source feature quantities, a proportion of the number of pixels having a predetermined luminance or more with respect to the number of pixels configuring a light source, and comparing the proportion with a proportion indicating vehicle light prepared as the target-area feature quantities.

4. The apparatus according to claim 3, wherein the target area is set in an area excluding the center of an area that indicates a light source.

5. The apparatus according to claim 4, wherein the target area is set in an area including a right end portion or a left end portion of an area that indicates a light source.

6. The apparatus according to claim 4, wherein the target area is set in an area including an upper end portion or a lower end portion of an area that indicates a light source.

7. A program that is stored in a Non-transitory computer readable medium and allows the computer to function as each of the means configuring the apparatus installed in a vehicle to detect different vehicle light from an image picked up outside the vehicle, the apparatus comprising: an image acquiring means for picking up an image around the vehicle and acquiring the image; a light source extracting means for extracting light sources in the image; a probability calculating means for calculating a target area probability that is a probability of a light source in a target area being different vehicle light, in accordance with a probability that light-source feature quantities at least including either of a color of light source and a shape of light source coincide with target-area feature quantities that are prepared as feature quantities of vehicle light, being correlated to the position of a target area, the target area indicating a preset site that is a part of an area indicating each of the light sources; and a light outputting means for outputting information that a light source having the target area probability of not less than a preset threshold is different vehicle light.

8. A vehicle light control apparatus installed in a vehicle to control the direction of optical axes in headlights of the vehicle, the apparatus comprising:
    a processor configured to implement the steps of:
    detecting a different vehicle that is present around the vehicle; and
    changing the direction of the optical axes of the headlights downward when the different vehicle is detected, wherein:
    the processor is further configured to:
    pick up an image around the vehicle and acquire the image;
    extract light sources in the image;
    calculate a target area probability that is a probability of a light source in a target area being different vehicle light, in accordance with a probability that light-source feature quantities at least including either of a color of light source and a shape of light source coincide with target-area feature quantities that are prepared as feature quantities of vehicle light, being correlated to the position of a target area, the target area indicating a preset site that is a part of an area indicating each of the light sources; and
    output information that a light source having the target area probability of not less than a preset threshold is different vehicle light.

9. A method of detecting different vehicle light from an image picked up outside a vehicle, the method comprising: picking up an image around the vehicle and acquiring the image; extracting light sources in the image; calculating a target area probability that is a probability of a light source in a target area being different vehicle light, in accordance with a probability that light-source feature quantities at least including either of a color of light source and a shape of light source coincide with target-area feature quantities that are prepared as feature quantities of vehicle light, being correlated to the position of a target area, the target area indicating a preset site that is a part of an area indicating each of the light sources; and outputting information that a light source having the target area probability of not less than a preset threshold is different vehicle light.

10. The apparatus according to claim 1, wherein:
    a light source area is extracted in a rectangular shape; and
    the target area probability is calculated by calculating, as the light-source feature quantities, a proportion of the number of pixels having a predetermined luminance or more with respect to the number of pixels configuring a light source, and comparing the proportion with a proportion indicating vehicle light prepared as the target-area feature quantities.

11. The apparatus according to claim 10, wherein the target area is set in an area excluding the center of an area that indicates a light source.

12. The apparatus according to claim 11, wherein the target area is set in an area including a right end portion or a left end portion of an area that indicates a light source.

13. The apparatus according to claim 11, wherein the target area is set in an area including an upper end portion or a lower end portion of an area that indicates a light source.

14. The apparatus according to claim 1, wherein the target area is set in an area excluding the center of an area that indicates a light source.

15. The apparatus according to claim 14, wherein the target area is set in an area including a right end portion or a left end portion of an area that indicates a light source.

16. The apparatus according to claim 14, wherein the target area is set in an area including an upper end portion or a lower end portion of an area that indicates a light source.

* * * * *